(12) United States Patent
Keum (10) Patent No.: US 11,032,364 B2
(45) Date of Patent: Jun. 8, 2021

(54) METHOD AND APPARATUS FOR INTERWORKING BETWEEN HETEROGENEOUS SYSTEMS

(71) Applicant: Samsung Electronics Co., Ltd., Gyeonggi-do (KR)

(72) Inventor: Ji-Eun Keum, Gyeonggi-do (KR)

(73) Assignee: Samsung Electronics Co., Ltd

( * ) Notice: Subject to any disclaimer, the term of this patent is extended or adjusted under 35 U.S.C. 154(b) by 166 days.

(21) Appl. No.: 15/771,268

(22) PCT Filed: Oct. 26, 2016

(86) PCT No.: PCT/KR2016/012103
§ 371 (c)(1),
(2) Date: Apr. 26, 2018

(87) PCT Pub. No.: WO2017/074034
PCT Pub. Date: May 4, 2017

(65) Prior Publication Data
US 2018/0316755 A1    Nov. 1, 2018

Related U.S. Application Data

(60) Provisional application No. 62/246,234, filed on Oct. 26, 2015.

(51) Int. Cl.
| | | |
|---|---|---|
| *H04L 29/08* | (2006.01) | |
| *H04L 29/06* | (2006.01) | |
| *H04W 4/70* | (2018.01) | |

(52) U.S. Cl.
CPC .......... *H04L 67/1074* (2013.01); *H04L 29/06* (2013.01); *H04L 29/08* (2013.01);
(Continued)

(58) Field of Classification Search
CPC ..... H04L 29/06; H04L 29/08; H04L 67/2823; H04L 67/28; H04L 69/08; H04L 69/18; H04L 67/1074; H04L 67/16; H04W 4/70
See application file for complete search history.

(56) References Cited

U.S. PATENT DOCUMENTS

2007/0016674 A1    1/2007  Shinohara et al.
2016/0007137 A1    1/2016  Ahn et al.
(Continued)

FOREIGN PATENT DOCUMENTS

| CN | 104995889 | 10/2015 |
|---|---|---|
| KR | 1020070009477 | 1/2007 |

(Continued)

OTHER PUBLICATIONS

Jaeseok Yun, Interoperability Test Based on Open-source IoT Platforms, Jun. 23, 2015 (Year: 2015).*

(Continued)

*Primary Examiner* — Abdulkader M Alriyashi
(74) *Attorney, Agent, or Firm* — The Farrell Law Firm, P.C.

(57) ABSTRACT

The present disclosure relates to a technology for a sensor network, machine to machine (M2M) communication, machine type communication (MTC), and the Internet of Things (IoT). The present disclosure may be utilized for an intelligent service (smart home, smart building, smart city, smart car or connected car, health care, digital education, retail business, security and safety-related service, etc.) on the basis of the technology. The present disclosure relates to a method for supporting interworking between heterogeneous systems, the method comprising the steps of: transmitting, to a first device, a message requesting a subscription to a resource; receiving, from the first device, a notification message indicating that the resource of the first device has been changed; transmitting, to a second device, a request (Continued)

message for monitoring a resource of the second device; and receiving a response message indicating the resource of the second device in response to the transmission of the request message, wherein the resource of the first device is associated with the second device.

2 Claims, 7 Drawing Sheets

(52) U.S. Cl.
CPC .............. *H04L 67/16* (2013.01); *H04L 67/28* (2013.01); *H04L 67/2823* (2013.01); *H04L 69/08* (2013.01); *H04L 69/18* (2013.01); *H04W 4/70* (2018.02)

(56) References Cited

U.S. PATENT DOCUMENTS

| | | | |
|---|---|---|---|
| 2016/0088420 | A1 | 3/2016 | Kim et al. |
| 2016/0234691 | A1* | 8/2016 | Jeong ...................... H04W 8/18 |
| 2017/0311303 | A1* | 10/2017 | Ahn .................. H04W 72/0406 |

FOREIGN PATENT DOCUMENTS

| | | |
|---|---|---|
| KR | 1020140132998 | 11/2014 |
| KR | 1020150067043 | 6/2015 |
| WO | WO 2014129802 | 8/2014 |
| WO | WO 2014185754 | 11/2014 |

OTHER PUBLICATIONS

Kiran Vedula et al., "oneM2M and OIC Interworking, TR-0023 Baseline after TP19", XP084011619, Sep. 23, 2015, 19 pages.
Jieun Keum et al., "OIC Interworking Procedure for Subscription and Notification", ARC-2015-2189R01, XP84013438, Oct. 20, 2015, 4 pages.
Kiran Vedula et al., "Updated Functional Architecture for oneM2M-OIC Interworking", ARC-2015-2180R01, XP084013388, Oct. 13, 2015, 5 pages.
Yingjie Hong et al., "Functional Architecture", oneM2M, TR-0023-V0.2.1, XP084013428, Oct. 19, 2015, 380 pages.
Samsung Electronics et al., "New Baseline V0.2.1 following Editheip Comments", TR-0023-V0.2.1, XP084017488, Jul. 8, 2016, 29 pages.
ETSI, Technical Specification, oneM2M OIC Interworking (oneM2M TS-0024, Version 2.0.0 Release 2, ETSI TS 118 124 V2.0.0, Sep. 13, 2016, 19 pages.
ETSI, Technical Specification, oneM2M Functional Architecture (oneM2M TS-0001 Version 1.13.1 Release 1), ETSI TS 118 101 V1.1.0, Mar. 1, 2016, 319 pages.
Open Interconnect Consortium (OIC), Draft OIC Core Candidate Specification Project B (V0.9.9), Part 1, XP055471813, Sep. 3, 2015, 173 pages.
European Search Report dated May 18, 2018 issued in counterpart application No. 16860217.5-1218, 11 pages.
PCT/ISA/210 Search Report issued on PCT/KR2016/012103 (pp. 3).
PCT/ISA/237 Written Opinion issued on PCT/KR2016/012103 (pp. 4).
Choi, Jinhyeock et al.; Functional Architecture for oneM2M—OIC interworking; ARC-2015-2118R04; Copyright 2015 oneM2M Partners; pp. 7.
Chinese Office Action dated Apr. 22, 2020 issued in counterpart application No. 201680062413.X, 16 pages.

* cited by examiner

METHOD AND APPARATUS FOR INTERWORKING BETWEEN HETEROGENEOUS SYSTEMS

PRIORITY

This application is a National Phase Entry of International Application No. PCT/KR2016/012103, filed on Oct. 26, 2016, and claims priority to U.S. Provisional Patent Application No. 62/246,234, filed Oct. 26, 2015, the content of each of which is incorporated herein by reference.

TECHNICAL FIELD

The present disclosure relates to a technology related to subscription and notification for interworking between heterogeneous systems.

BACKGROUND ART

The Internet is evolving from a human-centered connectivity network where humans generate and consume information into an Internet of Things (IoT) network where distributed entities such as things send, receive and process information without human intervention. Internet of Everything (IoE) technologies, in which a big data processing technology through connection with a cloud server, for example, are combined with the IoT technology, have also emerged. To implement IoT, various technologies, such as sensing technology, wired/wireless communication and network infrastructure, service interfacing technology, and security technology are required, and recently, even technologies for sensor network, Machine to Machine (M2M), Machine Type Communication (MTC) for connection between things are being studied.

In the IoT environment, intelligent Internet Technology (IT) services that create new values for human life by collecting and analyzing data generated from connected things may be provided. IoT may be applied to a variety of areas, such as smart home, smart building, smart city, smart car or connected car, smart grid, health care, smart home appliances and advanced medical services through convergence and combination between existing Information Technologies (IT) and various industrial applications.

Various attempts are being made to acquire dominance of the IoT markets, and representatively, there are industry consortiums such as AllSeen Alliance, Open Internet Consortium (OIC) and IP for Smart Objects (IPSO) Alliance. These industry consortiums centered on an international standard development organization such as oneM2M are actively developing related standard platform technologies.

oneM2M is a global partnership project of seven international standard development organizations from Korea (TTA), Europe (ETSI), North America (ATIS, TIA), China (CCSA) and Japan (ARIB, TTC) that gather together for the purpose of developing a common IoT platform.

The common platform technology developed by oneM2M provides 12 common functions: registration, search, security, group management, data management, subscription and notification, device management, application management, data transfer management, network service utilization, location information management, and service layer charging. The oneM2M common platform has a Resource Oriented Architecture (ROA) structure and can thus be accessed by the representational safe transfer (REST) application programming interface (API) like a web.

OIC is an industry consortium launched in July 2014 mainly by Intel, Samsung Electronics, Atmel, Wind River, etc., and is now developing a platform to ensure interoperability and requirements for connecting IoT devices.

Key functions of the platform being developed by OIC include device discovery, data transfer, device management, data management, and security function, through which device-based interoperability and service level interoperability are enabled.

Currently, for each of the platform developed by oneM2M and the platform being developed by OIC is developed, there is a need for a technology to support compatibility between the platforms

DETAILED DESCRIPTION OF THE INVENTION

Technical Problem

An objective of the present disclosure is to provide a method and apparatus for supporting interworking between heterogeneous systems.

Technical Solution

In accordance with an aspect of the present disclosure, a method for supporting interworking between heterogeneous systems is provided. The method includes sending a message requesting subscription to a resource to a first device; receiving a notification message indicating that a resource of the first device has changed from the first device; sending a request message to a second device to monitor a resource of the second device; receiving a response message indicative of a resource of the second device in return for transmission of the request message, wherein the resource of the first device is related to the second device.

In accordance with another aspect of the present disclosure, an apparatus for supporting interworking between heterogeneous systems is provided. The apparatus includes a transceiver configured to send a message requesting subscription to a resource to a first device, receive a notification message indicating that a resource of the first device has changed from the first device, send a request message to a second device to monitor a resource of the second device, and receive a response message indicative of a resource of the second device in return for transmission of the request message; and a controller configured to control the transceiver, wherein the resource of the first device is related to the second device.

MODE FOR CARRYING OUT THE INVENTION

Hereinafter, embodiments of the present invention are described in detail with reference to the accompanying drawings. In the description of the present disclosure, if it is determined that a detailed description of commonly-used technologies or structures related to the invention may unnecessarily obscure the subject matter of the present disclosure, the detailed description will be omitted. Further, terms, as will be mentioned later, are defined by taking functionalities of the present disclosure into account, but may vary depending on certain practices or intentions of users or operators. Accordingly, the definition of the terms should be made based on the descriptions throughout this specification.

oneM2M and OIC will now be described.

Figure 1:
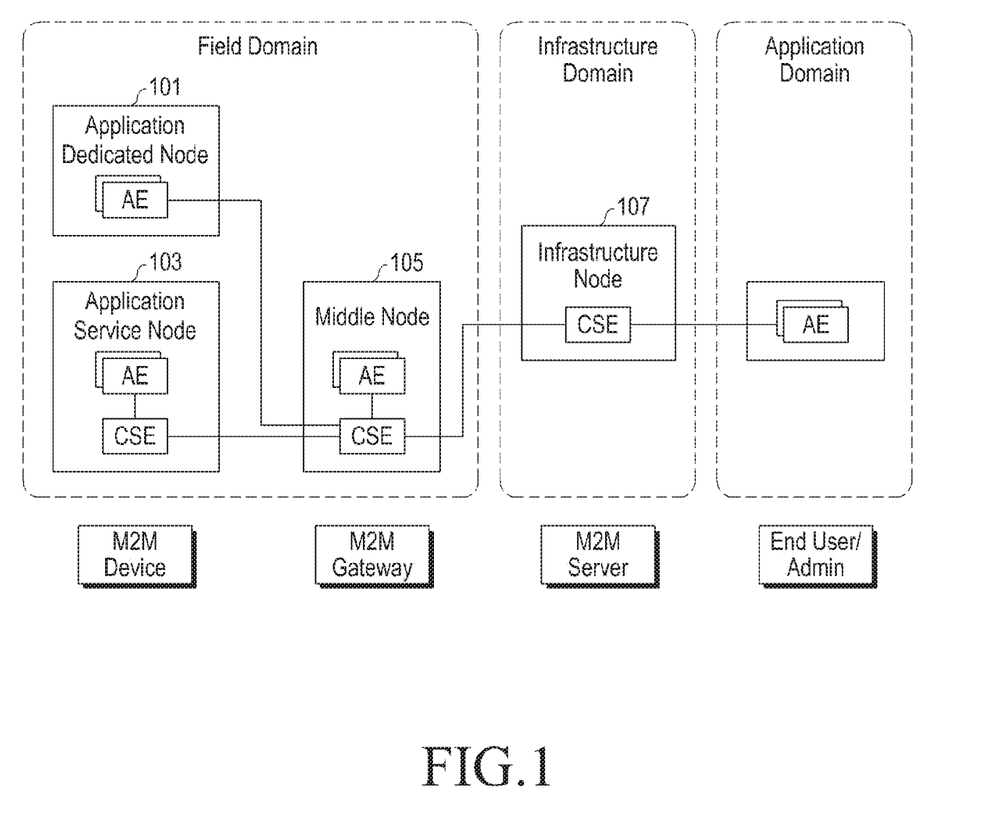
FIG. 1 shows a network configuration of oneM2M.

FIG. 1 shows a network configuration of oneM2M.

Referring to FIG. 1, a network of oneM2M may include an Application Dedicated Node (ADN) 101, an Application Service Node (ASN) 103, a Middle Node (MN) 105, and an Infrastructure Node (IN) 107.

The ADN 101 is a device including an Internet of Things (IoT) application, which means a constrained device having constrained capability only with IoT service logic. The ASN 103 refers to an IoT device that offers not only an IoT application but also a common service. The MN 105 is an IoT gateway that connects other nodes and the network IN 107, and the IN 107 may be an IOT server located in a network infrastructure for providing an IoT service.

The aforementioned nodes may each include one or more Application Entities (AEs) or Common Service Entities (CSE).

The AE provides application logic for end-to-end IoT solutions.

The CSE provides common service functions available for common use by various AEs of IoT. The common service functions include a data management and storage function, a communication management and transfer process function, a registration function, a security function, a subscription and notification function, a group management function, etc.

When an AE or a CSE subscribes to a change to a resource under a particular condition and the resource is changed to meet the condition, the subscription and notification function plays a role in notifying this. The subscription and notification function may correspond to the Observe structure of OIC, which will be described later.

oneM2M conforms to a resource-oriented architecture (RoA). The common service function is provided with operation on a resource. The resource has a tree structure and may be addressed with a unique address (e.g., URI). The resource is stored in the CSE, and the AE cannot have a resource.

The resource has various resource types, each of which is defined by attributes and child resource types. For example, an AE resource type may include attributes of AE-related information (e.g., application name, network address, semantic information), and may have container resource type for storing information generated by the AE and a group resource type for forwarding operation to a group as child resources. The resource type may be created for an actual resource through create operation and may use a service through modify, obtain, delete, notify operations on the resource.

The resource type includes an AE resource type, a container resource type, a subscription resource type, etc.

For the AE resource type, AE information registered in the CSE or AE information of other CSE, which is registered in the CSE is stored.

For the container resource type, data generated in the CSE or in the AE is stored.

For the subscription resource type, data for performing a function to notify that a state of a resource is changed through notification is stored.

Figure 2:
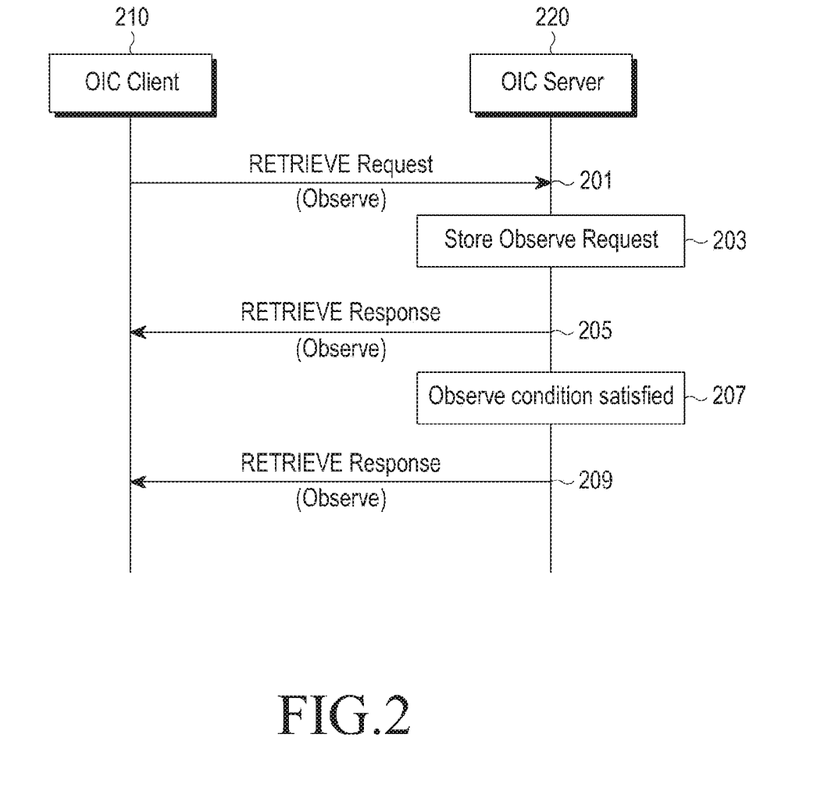
FIG. 2 shows the Observe mechanism of OIC.

FIG. 2 shows the Observe mechanism of OIC.

The Observe mechanism refers to monitoring a resource by sending a retrieve request message. An OIC client 210 and an OIC server refers to a client and a server, respectively, that support OIC.

Referring to FIG. 2, the OIC client 210 sends a retrieve request message to the OIC server 220 for monitoring a resource of the OIC server 220, in 201.

The OIC server 220 stores the retrieve request message, in 203.

The OIC server 220 sends a retrieve response message to the OIC client 210 in response to the retrieve request message, in 205.

When the resource of the OIC server 220 is changed for any reason, the OIC server 220 detects this, in 207. Alternatively, only when the resource of the OIC server 220 meets a particular condition, the OIC server 220 may detect it.

The OIC server 220 may notify the OIC client 210 that the resource of the OIC server 220 has changed in a retrieve response message, in 209.

Interworking technologies between OIC and oneM2M will now be described according to various embodiments of the present disclosure.

Figure 3:
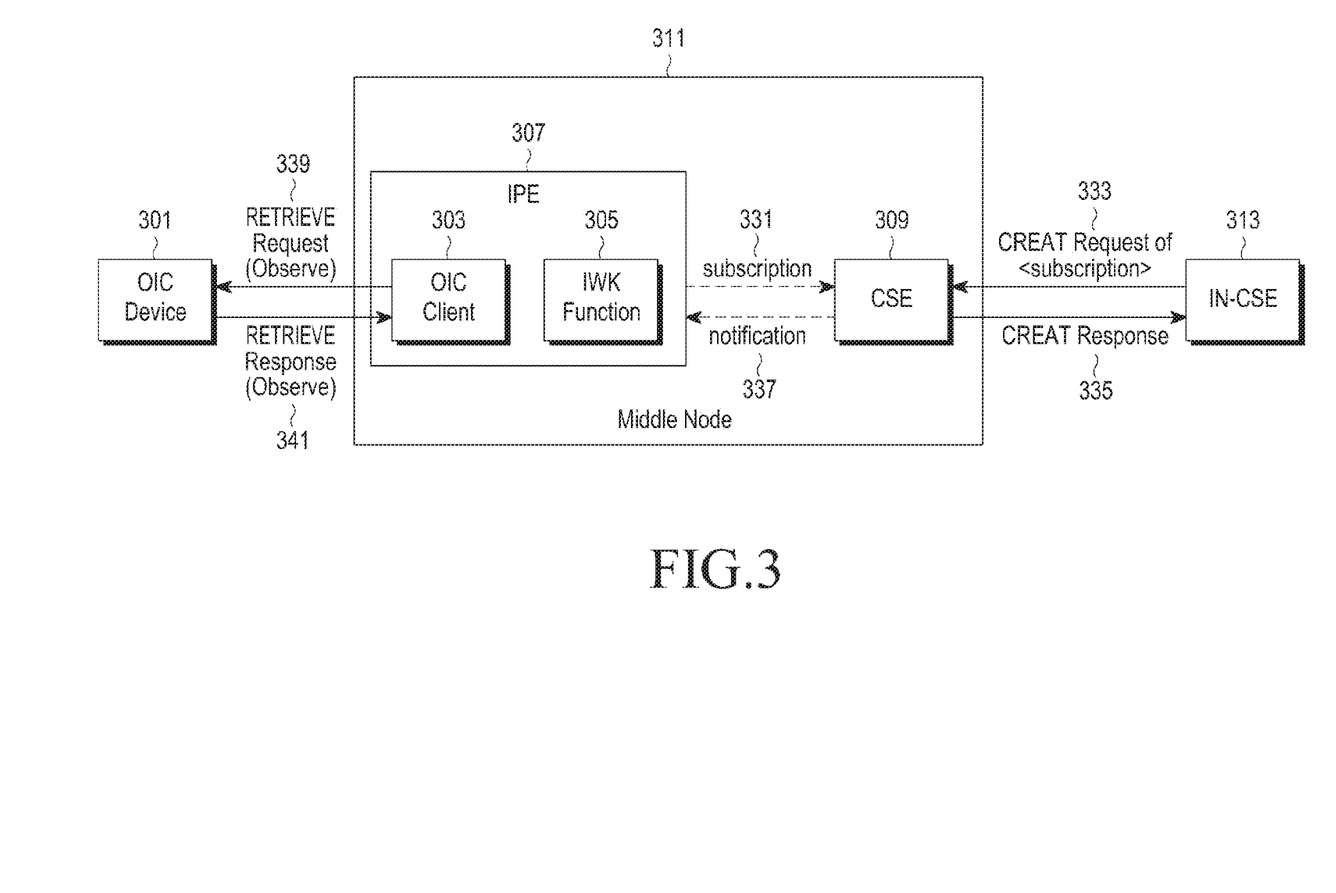
FIG. 3 shows a procedure for subscription between oneM2M and OIC, according to an embodiment of the present disclosure.

FIG. 3 shows a subscription procedure between oneM2M and OIC, according to an embodiment of the present disclosure.

Referring to FIG. 3, an interworking proxy entity (IPE) 307 is a network node for performing a function of an OIC client and an interworking function with oneM2M. The IPE 307 may be divided into an OIC client 303 and an interworking function 305 based on functions. The interworking function acts as an entity of the application layer in the oneM2M standard. The interworking function 305 of the IPE 307 will now be described.

In the following description, < > represents a resource of the aforementioned resource tree structure. For example, the resource tree structure may be represented in MN-CSEBase/OIC-AE/Container/Subscription, and each resource is represented with <container>, <subscription>, etc. Furthermore, <subscription> may be represented as a child resource of <container>.

The IPE 307 is assumed to be subscribing to a container resource managed by a CSE 309 to know of a create request for <subscription>, in 331. In this case, an attribute value of a notification URI of the <subscription> resource needs to be a URI of the IPE 307.

A CSE in an infrastructure node (denoted as IN-CSE) 313 sends a request message to create a <subscription> resource in a CSE in a middle node, in 333.

The CSE 309 in the middle node sends a response message to the create request for resource to the IN-CSE 313, in 335.

The CSE 309 in the middle node sends a message indicating that the <subscription> resource has been created in the tree structure of the resource to the IPE 307, in 337.

The interworking function 305 in the IPE 307 may receive the message from the CSE 309 and convert the message to a retrieve request message. A uniform resource identifier (URI) of an upper resource (i.e., a parent resource) of the <subscription> resource may correspond to parameter "to" in the retrieve request message. A URI of an OIC client in an intermediary may correspond to parameter "fr", i.e., from, in the retrieve request message. Furthermore, a resource ID of the <subscription> resource may correspond to parameter "ri" in the retrieve request message, i.e., an identifier of the retrieve request.

The OIC client 303 sends the retrieve request message to the OIC device 301, in 339. The OIC device as herein used refers to the aforementioned OIC server.

The OIC device 301 sends a retrieve response message to the OIC client 303 in response to the retrieve request message, in 341.

In this way, a change to the resource of the OIC device 301 may be subscribed to.

Figure 4:
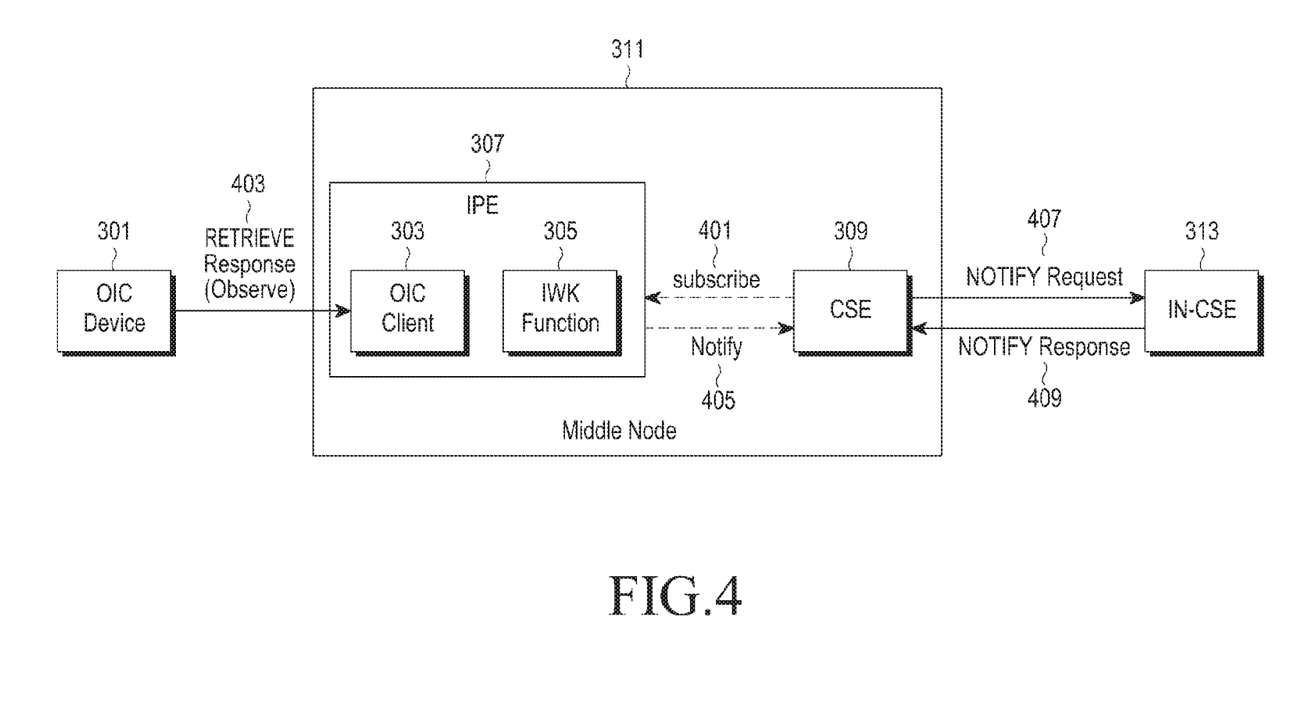
FIG. 4 shows a notification procedure between oneM2M and OIC, according to an embodiment of the present disclosure.

FIG. 4 shows a notification procedure between oneM2M and OIC, according to an embodiment of the present disclosure.

Referring to FIG. 4, the CSE 309 in the middle node is assumed to be subscribing to a resource of the OIC device 301 through the IPE 307, in 401.

When a change occurs to the resource of the OIC device 301, the OIC device 301 sends a message notifying of a changed resource of the OIC device 301 to the OIC client 303 in the retrieve response message, in 403. In this regard, a particular condition may be set up for the resource change, and only when the particular condition is met, the notification message may be sent to the OIC client 303.

The IPE 307 converts the retrieve response message to a notify request message of oneM2M and sends the notify request message to the CSE 309 in the middle node 311, in 405. Parameter "cn" in the retrieve response message may correspond to parameter "content" in the notify request message of oneM2M. The parameter "cn" refers to information of a resource requested by the OIC client 303.

The CSE 309 in the middle node 311 sends the notify request message of oneM2M to the IN-CSE 313, in 407.

The IN-CSE 313 sends a notify response message of oneM2M to the CSE 309 in the middle node in response to the notify request message of oneM2M, in 409.

Figure 5:
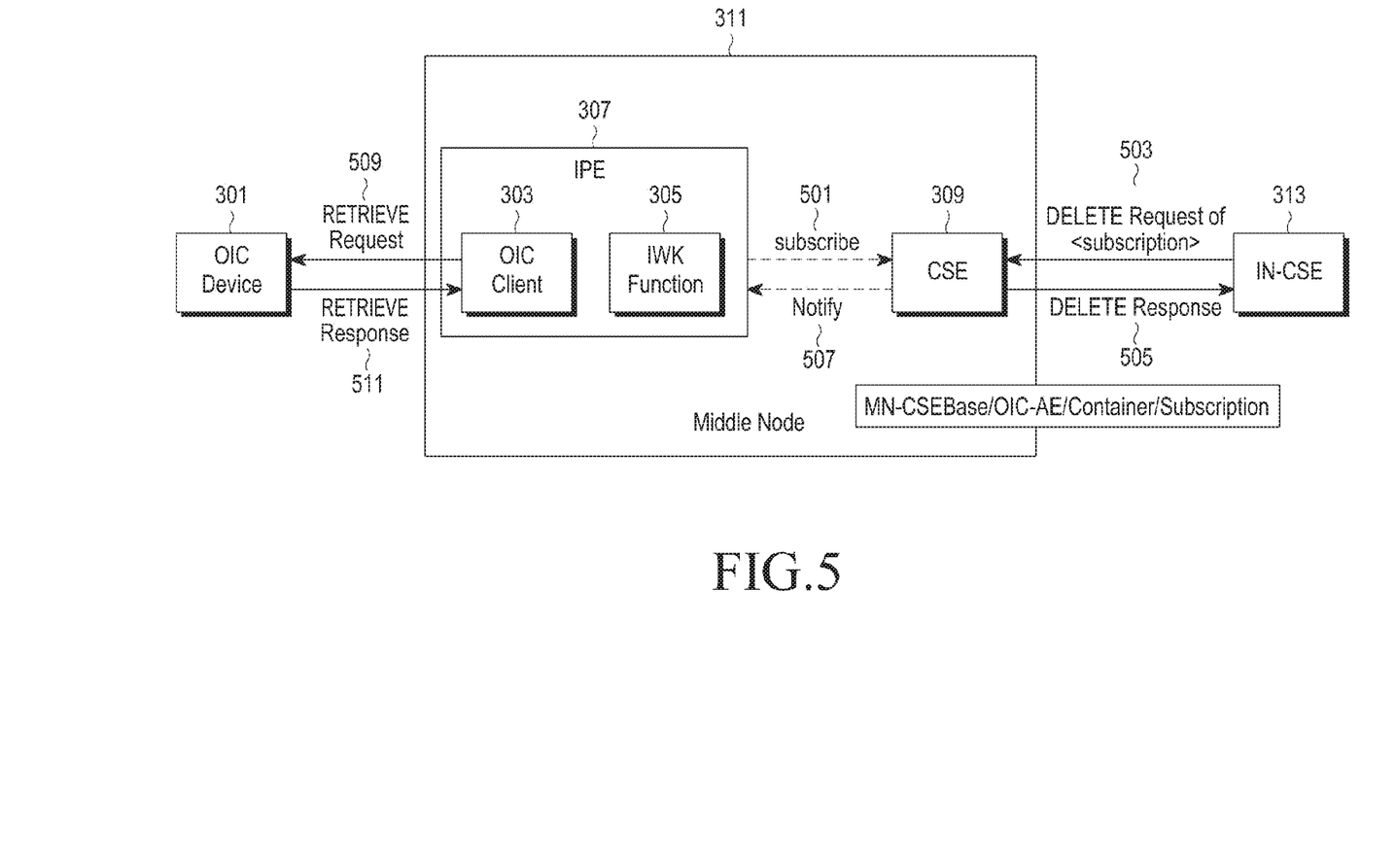
FIG. 5 shows a procedure for canceling subscription between oneM2M and OIC, according to an embodiment of the present disclosure.

FIG. 5 shows a procedure for canceling subscription between oneM2M and OIC, according to an embodiment of the present disclosure.

Once a procedure for canceling the subscription is completed, even if a resource of the OIC device is changed, the IN-CSE may not be aware of it.

Referring to FIG. 5, the IPE 307 is assumed to be subscribing to a container resource managed by a CSE 309 to know of a delete request for the <subscription> resource of the CSE in the middle node 311, in 501. A resource architecture of the CSE 309 in the middle node 311 may be, for example, MN-CSEBase/OIC-AE/Container/Subscription.

The IN-CSE 313 sends a delete request message for the <subscription> resource of the CSE 309 in the middle node 311 to the CSE 309 in the middle node 311, in 503.

The CSE 309 in the middle node 311 sends a response message to the delete request to the IN-CSE 313, in 505.

The CSE 309 in the middle node 311 notifies the IPE 307 that the <subscription> resource has been deleted, in 507.

The OIC client 303 sends a retrieve request message to the OIC device 301, in 339. The retrieve request message has no instruction of 'observe', in 509.

The OIC device 301 sends a retrieve response message to the OIC client 303 in response to the retrieve request message, in 511.

Figure 6:
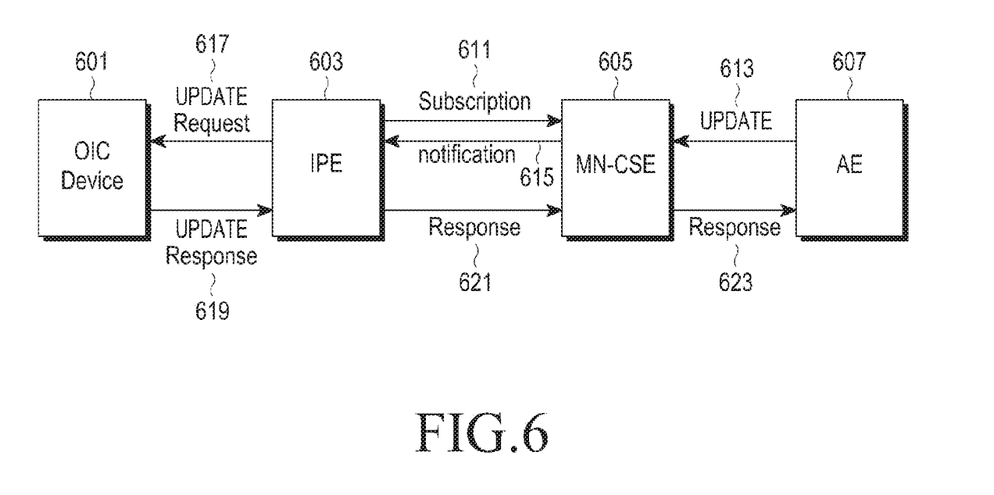
FIG. 6 shows an update procedure between oneM2M and OIC, according to an embodiment of the present disclosure.

FIG. 6 shows an update procedure for a resource between oneM2M and OIC, according to an embodiment of the present disclosure.

The OIC device sends notification by itself when a resource of the OIC device is changed according to a setting, but the update procedure is manually performed for the AE to figure out whether the resource of the OIC device has changed.

Referring to FIG. 6, an IPE 603 is assumed to be subscribing to a resource of a CSE 605 in a middle node to know of an update request for the resource, in 611.

An AE 607 sends an update request message for a resource of an OIC device 601 to the CSE 605 in the middle node, in 613. The operation is described herein to be performed by the AE, but may also be performed by an IN-CSE.

The CSE 605 in the middle node sends a notification request message to update whether the resource of the OIC device 601 has changed to the IPE 603, in 615.

The IPE 603 sends an update request message for the resource of the OIC device 601 to the OIC device 601, in 617.

The OIC device 601 sends an update response message for the resource of the OIC device 601 to the IPE 603, in 619.

The IPE 603 converts the update response message for the resource of the OIC device 601 to a oneM2M response message and sends the oneM2M response message to the CSE 605 in the middle node, in 621.

The CSE 605 in the middle node sends an update response message for the resource of the OIC device 601 to the AE 607, in 623.

The CSE 605 in the middle node may use an event type, "update a direct child resource for subscribing to a resource", for the update procedure.

Figure 7:
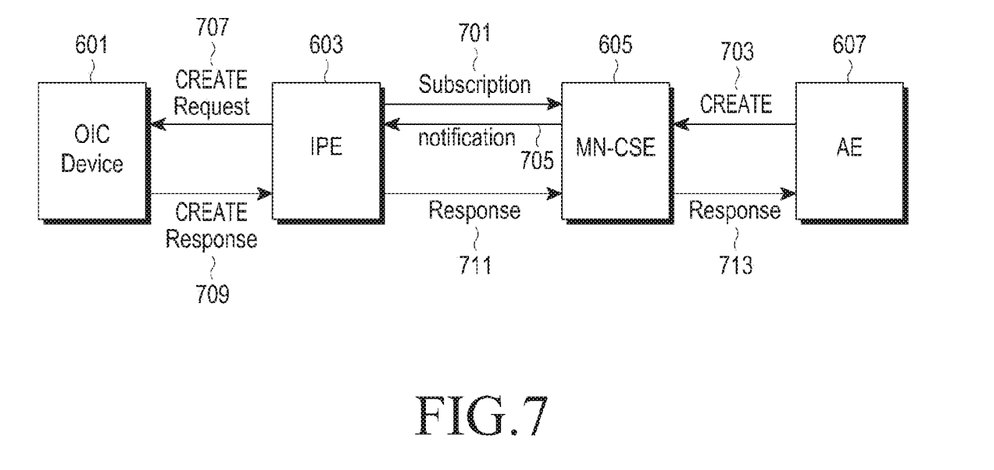
FIG. 7 shows a resource creation procedure of an OIC client between oneM2M and OIC, according to an embodiment of the present disclosure.

FIG. 7 shows a procedure of creating a resource of an OIC device between oneM2M and OIC, according to an embodiment of the present disclosure.

Referring to FIG. 7, the IPE 603 is assumed to be subscribing to a resource of the CSE 605 in the middle node to know of a request to create a resource of the OIC device, in 701.

The AE 607 sends a create request message for a resource of the OIC device to the CSE 605 in the middle node, in 703. The operation is also described herein to be performed by the AE, but may also be performed by an IN-CSE.

The CSE in the middle node 605 sends a notification message to create the resource of the OIC device 601 to the IPE 603, in 705.

The IPE 603 sends a create request message to create the resource of the OIC device 601 to the OIC device 601, in 707.

After creating the resource, the OIC device 601 sends a create response message indicating that the resource of the OIC device 601 has been created to the IPE 603, in 709.

The IPE 603 converts the create response message to a oneM2M response message and sends the oneM2M response message to the CSE 605 in the middle node, in 711.

The CSE 605 in the middle node sends a response message about the creation to the AE 607, in 713.

The CSE 605 in the middle node may use an event type, "create a direct child resource for a resource to be subscribed to", for the procedure to create the resource.

Figure 8:
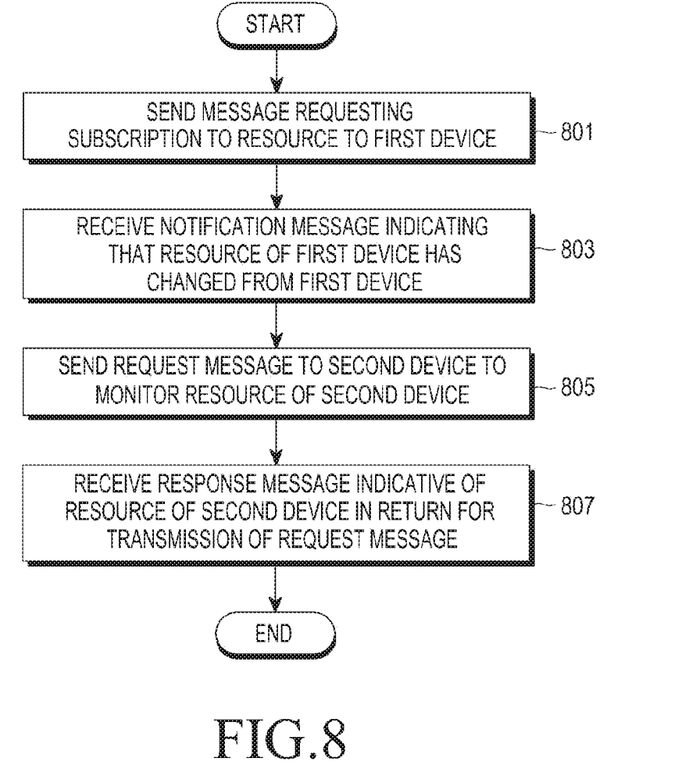
FIG. 8 is a flowchart of operation of an interworking proxy entity, according to an embodiment of the present disclosure.

FIG. 8 is a flowchart of operation of an interworking proxy entity (IPE), according to an embodiment of the present disclosure.

The IPE sends a message requesting subscription to a resource to a first device to support interworking between the first device and a second device, in 801. The first device may be a oneM2M device, and the second device may be an OIC device.

The IPE receives a notification message indicating that a resource of the first device has changed from the first device, in 803.

The IPE sends a request message to the second device to monitor a resource of the second device, in 805.

The IPE receives a response message indicative of the resource of the second device in return for transmission of the request message, in 807.

It is characterized herein that the resource of the first device is related to the second device.

Figure 9:
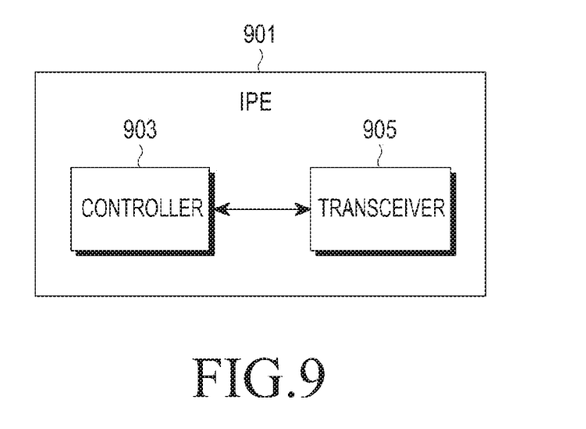
FIG. 9 shows a block diagram of an interworking proxy entity, according to an embodiment of the present disclosure.

FIG. 9 shows a block diagram of an interworking proxy entity, according to an embodiment of the present disclosure.

For convenience of explanation, illustration and description of an element that is not directly related to the present disclosure will be omitted.

Referring to FIG. 9, an IPE 901 may include a controller 903 and a transceiver 905. Although it is operated with multiple components, the following operation may be performed in a single component as needed. The controller 903 controls the transceiver 905 and converts oneM2M-related and OIC-related messages. The transceiver 905 sends or receives messages with an OIC client and a CSE.

Several embodiments have been described above, but a person of ordinary skill in the art will understand and appreciate that various modifications can be made without departing the scope of the present invention. Thus, it will be apparent to those ordinary skilled in the art that the disclosure is not limited to the embodiments described, which have been provided only for illustrative purposes. Furthermore, the embodiments may be operated by being combined with one another if necessary.

The invention claimed is:

1. A method for supporting interworking between heterogeneous systems by an Interworking Proxy Entity (IPE), the method comprising:
    subscribing to a resource of Common Services Entity (CSE);
    identifying that a one Machine-to-Machine (oneM2M) device requests a creation of a resource of an Open Internet Consortium (OIC) device;
    transmitting a request message to the OIC device regarding a request for the creation of the resource of the OIC device;
    receiving a response message regarding the creation of the resource of the OIC device from the OIC device in response to transmitting the request message; and
    transmitting a converted response message to the CSE by converting the response message,
    wherein an event type indicating "create a direct child resource for a resource to be subscribed to" is used for the creation of the resource of the OIC device.

2. An apparatus for supporting interworking between heterogeneous systems by an Interworking Proxy Entity (IPE), the apparatus comprising:
    a transceiver; and
    a processor coupled to the transceiver,
    wherein the processor is configured to:
    subscribe to a resource of Common Services Entity (CSE),
    identify that a one Machine-to-Machine (oneM2M) device requests a creation of a resource of an Open Internet Consortium (OIC) device,
    transmit a request message to the OIC device regarding a request for the creation of the resource of the OIC device,
    receive a response message regarding the creation of the resource of the OIC device from the OIC device in response to transmitting the request message, and
    transmit a converted response message to the CSE by converting the response message,
    wherein an event type indicating "create a direct child resource for a resource to be subscribed to" is used for the creation of the resource of the OIC device.

* * * * *